(12) United States Patent
Minefuji

(10) Patent No.: US 8,014,075 B2
(45) Date of Patent: Sep. 6, 2011

(54) PROJECTION TYPE IMAGE DISPLAY DEVICE

(75) Inventor: Nobutaka Minefuji, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 12/246,795

(22) Filed: Oct. 7, 2008

(65) Prior Publication Data

US 2009/0116124 A1    May 7, 2009

(30) Foreign Application Priority Data

Nov. 6, 2007   (JP) .................................. 2007-288148
Aug. 5, 2008   (JP) .................................. 2008-201561

(51) Int. Cl.
*G02B 3/00* (2006.01)

(52) U.S. Cl. ........................................ 359/649; 359/631
(58) Field of Classification Search .......... 359/630–631, 359/649
See application file for complete search history.

(56) References Cited

U.S. PATENT DOCUMENTS

| | | | | |
|---|---|---|---|---|
| 4,799,765 A | * | 1/1989 | Ferrer | 359/13 |
| 5,483,307 A | * | 1/1996 | Anderson | 353/98 |
| 6,634,759 B1 | * | 10/2003 | Li | 359/853 |

FOREIGN PATENT DOCUMENTS

| | | |
|---|---|---|
| JP | A-2004-258620 | 9/2004 |
| JP | A-2006-235516 | 9/2006 |
| JP | A-2008-107801 | 5/2008 |

* cited by examiner

*Primary Examiner* — Joseph Martinez
*Assistant Examiner* — James R Greece
(74) *Attorney, Agent, or Firm* — Oliff & Berridge, PLC

(57) ABSTRACT

A projection type image display device comprising: a projection optical system having a first refracting optical section having a plurality of lenses, a reflecting optical section having at least one concave reflecting surfacer and a second refracting optical section in order from a reduction side; and an image forming optical section disposed on an anterior stage of a light path as the reduction side of the projection optical system, wherein the second refracting optical section has an exit lens having either:

(1) a roughly constant thickness and disposed in a posterior stage of the light path from an exit pupil position at which a principal ray reflected by the reflecting surface and proceeding towards the maximum field angle and the optical axis of the reflecting optical section intersect with each other, and an optical surface of a magnification side of the exit lens has a shape convex towards the magnification side;

or (2) a roughly constant thickness and disposed between the reflecting optical section and an exit pupil position at which a principal ray reflected by the reflecting surface and proceeding towards the maximum field angle and the optical axis of the reflecting optical section intersect with each other, and an optical surface of a magnification side of the exit lens has a shape concave towards the magnification side.

11 Claims, 12 Drawing Sheets

PROJECTION TYPE IMAGE DISPLAY DEVICE

BACKGROUND

1. Technical Field

The present invention relates to a projection type image display device incorporating a projection optical system adapted to project an image formed by a liquid crystal panel or the like on a screen.

2. Related Art

As a projection optical system adapted to project an image of a projection device disposed in the vicinity of a screen on the screen, there can be cited what has a refracting optical system including a plurality of lenses disposed on a reduction side and a concave reflecting mirror disposed on an magnification side and for folding a light path, and performs enlarged close-range projection on the screen (e.g., JP-A-2004-258620, JP-A-2006-235516).

However, such a projection optical system as described above has an extremely short focal length because of its super wide view angle, and in particular, has a small light beam diameter in the vicinity of the optical axis. In contrast, the light beam towards the periphery of picture plane becomes extremely wide in order for provide an enough amount of peripheral light. Further, in the case in which a cover plate with parallel planes for protecting the concave reflecting mirror is disposed in the vicinity of the concave reflecting mirror, the angle of the light beam entering the peripheral section of the cover plate becomes very superficial due to the wide angle projection, thus considerable deterioration in the image quality and a considerable amount of reflection on the surface of the cover plate are caused. Further, in the projection optical system using this kind of concave mirror, since the light paths are collected near the focal position or the exit pupil position of the concave mirror, it is preferable to dispose the cover plate at a position slightly distant from the light-collected section from the viewpoint of safety and so on. However, in such a case, since the size of the cover plate is apt to increase as the parallel plane cover becomes distant from the light-collected position, and there is caused a problem regarding the strength of the cover plate, supporting method there of, and so on.

SUMMARY

Therefore, the invention has an advantage of providing a projection type image display device, which can be correspond to the needs for achieving further wide-angle, provided with a small-sized cover capable of preventing deterioration in the image quality and reflection on the surface.

A projection type image display device according to a first aspect of at least one embodiment of the invention is (a) a projection optical system having a first refracting optical section having a plurality of lenses, a reflecting optical section having at least one concave reflecting surface, and a second refracting optical section in order from a reduction side, and (b) an image forming optical section disposed on an anterior stage of a light path as the reduction side of the projection optical system, (a1) the second refracting optical section has an exit lens having a roughly constant thickness and disposed in a posterior stage of the light path from a point (in this intersection point, the projection light relatively converges, and therefore this intersection point is referred to as an exit pupil position for the sake of convenience) at which a principal ray reflected by the reflecting surface and proceeding towards the maximum field angle and the optical axis of the reflecting optical section intersect with each other, and (a2) an optical surface of an magnification side of the exit lens has a shape convex towards the magnification side. It should be noted that the posterior stage of the light path denotes that the lens is disposed on the light exit side (i.e., on the magnification side) relatively downstream therefrom in the proceeding direction of the projection light. Therefore, in the case in which the surface projection type screen, for example, is disposed at the posterior stage of the light path from the projection optical system, the exit lens is disposed between the exit pupil position and the screen.

In first aspect of at least one embodiment of the invention, since the thickness of the exit lens is roughly constant and the optical surface on the magnification side of the exit lens has a surface convex towards the magnification side in the second refracting optical section, it is possible to make the second refraction optical section to function as a protective cover for uniformly covering the projection optical system even in the case in which the projection is performed with a wide field angle. On this occasion, since the exit lens has the concave shape with respect to the exit pupil position, the size as the protective cover can be relatively small, and moreover, the influence to the image quality can be reduced while suppressing the reflection in the peripheral area.

A second aspect of at least one embodiment of the invention is (a) a projection optical system having a first refracting optical section having a plurality of lenses, a reflecting optical section having at least one concave reflecting surface, and a second refracting optical section in order from a reduction side, and (b) an image forming optical section disposed on an anterior stage of a light path as the reduction side of the projection optical system, (a1) the second refracting optical section has an exit lens having a roughly constant thickness and disposed between the reflecting optical section and an exit pupil position at which a principal ray reflected by the reflecting surface and proceeding towards the maximum field angle and the optical axis of the reflecting optical section intersect with each other, and (a2) an optical surface of an magnification side of the exit lens has a shape concave towards the magnification side.

In second aspect of at least one embodiment of the invention, since the thickness of the exit lens is roughly constant and the optical surface on the magnification side of the exit lens has a surface concave towards the magnification side in the second refracting optical section, it is possible to make the second refraction optical section to function as a protective cover for uniformly covering the projection optical system even in the case in which the projection is performed with a wide field angle. On this occasion, since the exit lens has also the concave shape with respect to the exit pupil position, the size as the protective cover can be relatively small, and moreover, the influence to the image quality can be reduced while suppressing the reflection in the peripheral area.

In a specific aspect of at least one embodiment of the invention, the second refracting optical section is formed of one exit lens as a meniscus lens having a convex surface facing the magnification side or a concave surface facing the magnification side. In this case, the second refracting optical section can be realized with a simple configuration.

According to another aspect of at least one embodiment of the invention, the meniscus lens has a pair of spherical optical surfaces, and an optical axis identical to the optical axis of the reflecting optical section. In this case, the second refracting optical section can be configured with the meniscus lens which can easily be manufactured.

According to still another aspect of at least one embodiment of the invention, the meniscus lens has a domed shape with a concentric sphere shape having a center of curvature of the lens surface in the vicinity of the exit pupil position. Since the projection light reflected by the reflecting optical section has a high tendency to pass through the exit pupil position or the vicinity thereof, by disposing the center of curvature of the meniscus lens in the vicinity of the exit pupil position, the incident angle to the lens can be set to be roughly perpendicular thereto. Further, by adopting the concentric sphere shape, it becomes possible to reduce the effect of the entrance section as a lens, thus the size of the meniscus lens, namely the second refracting optical section can be reduced while reducing the influence of the meniscus lens to the image formation.

According to still another aspect of at least one embodiment of the invention, the meniscus lens has an optical decentering axis with respect to the optical axis of the reflecting optical section. In the reflecting optical system using the curved mirror of this kind, since the light on the optical axis returned to the first optical system after reflected by the curved mirror, the vicinity of the optical axis is not used on the screen. In other words, since it is sufficient to ensure only the off-axis image quality, it is possible to effectively achieve a kind of correction effect with respect to the off-axis imagery by using decentering and so on.

According to still another aspect of at least one embodiment of the invention, at least one of the pair of optical surfaces of the meniscus lens is formed of an aspheric surface. In this case, it is possible to achieve the correction effect on the imaging condition on the screen using the meniscus lens.

According to still another aspect of at least one embodiment of the invention, the meniscus lens is made of a resin material. In this case, manufacturing of the meniscus lens becomes easy, thus it becomes easy to curve the meniscus lens deeply, and it also becomes easy to form the aspheric shape.

According to still another aspect of at least one embodiment of the invention, an optical axis common to at least a part of the magnification side of the first refracting optical section and the optical axis of the reflecting optical section extends perpendicular to a screen for projection. In this case, what has contribution to imagery as the reflecting optical section becomes basically the optical surface located on the opposite side of the screen across the optical axis, and such an optical surface, namely the reflecting optical section can be protected by the second refracting optical section disposed on the screen side.

According to still another aspect of at least one embodiment of the invention, assuming that a curvature radius of the reflecting surface of the first refracting optical section is Ra, a curvature radius of the convex surface side of the exit lens of the second refracting optical section is R1, a curvature radius of the concave surface side thereof is R2 and the distance between the exit pupil position and the position at which the principal ray intersects with the concave surface side of the exit lens is S, at least one of the following conditions (1) through (3) is satisfied.

$$0.2<|R1/Ra|<2.0 \quad (1)$$

$$0.7<R2/R1<1.1 \quad (2)$$

$$0.3<S/R2<1.5 \quad (3)$$

It should be noted that in the case in which the optical surface of the exit lens on the magnification side has a convex shape towards the magnification side, the entrance surface of the exit lens becomes a concave surface with a curvature radius of R2 and the exit surface becomes a convex surface with a curvature radius of R1. On the other hand, in the case in which the optical surface of the exit lens on the magnification side has a concave shape towards the magnification side, the entrance surface of the exit lens becomes a convex surface with a curvature radius of R1, and the exit surface becomes a concave surface with a curvature radius of R2.

The conditional expression (1) described above determines the condition of the curvature radius of the exit lens. If the shape of the exit lens comes closer to a plane beyond the upper limit of the conditional expression (1), the effective area of the exit lens becomes large in order for including the light beam diffused from the reflecting surface with a wide angle, and the incident angle of the light beam entering the exit lens becomes large in the peripheral area of the picture place to problematically increase the reflectance. If the curvature radius of the exit lens becomes too small beyond the lower limit of the conditional expression (1), large aberration generates in the exit lens, which causes deterioration in performance.

The conditional expression (2) described above determines the condition related to the power of the exit lens. It is preferable that the exit lens has the entrance surface and the exit surface with the curvature radius close to each other to have weak power within the range determined by the conditional expression (2) Specifically, if the exit lens becomes to have positive power beyond the upper limit of the conditional expression (2), an effect of narrowing the field angle appears to problematically increase the load of the reflecting surface. In contrast, if the negative power of the exit lens becomes too strong beyond the lower limit of the conditional expression (2), although preferable from the viewpoint of widening the angle, it causes to degrade the distortion aberration and the field curvature preferably corrected in the first refracting optical section. Further, if the positive or negative power of the exit lens becomes too strong, the performance is problematically deteriorated by the positional accuracy when installing the devices.

The conditional expression (3) described above determines the conditions related to the position and the shape of the exit lens. Specifically, by appropriately setting the curvature radius of the concave surface of the exit lens and the focusing position of the reflecting surface with respect to the light beam diffused with a very wide angular range from the reflecting surface, it becomes possible to suppress the deterioration in performance to the minimum, and to narrow the range of the incident angle of the light beams to the exit lens, and thus, it becomes possible to prevent the partial light intensity drop. Specifically, if the curvature radius of the concave surface of the exit lens becomes too small compared to the distance from the focusing position of the reflecting surface to the exit lens beyond the upper limit of the conditional expression (3), a large aberration is problematically generated. In contrast, if the curvature radius of the concave surface of the exit lens becomes too large compared to the distance from the focusing position of the reflecting surface to the exit lens beyond the lower limit of the conditional expression (3), the incident angle to the exit lens becomes large in the peripheral area of the screen to increase the reflectance.

According to still another aspect of at least one embodiment of the invention, a projection type image display device comprising:

a projection optical system having a first refracting optical section having a plurality of lenses, a reflecting optical section having at least one concave reflecting surface, and a second refracting optical section in order from a reduction side; and an image forming optical section disposed on an anterior stage of a light path as the reduction side of the projection optical system, wherein the second refracting optical section has an exit lens having either:

(1) a roughly constant thickness and disposed in a posterior stage of the light path from an exit pupil position at which a principal ray reflected by the reflecting surface and proceeding towards the maximum field angle and the optical axis of the reflecting optical section intersect with each other, and an optical surface of a magnification side of the exit lens has a shape convex towards the magnification side;

or (2) a roughly constant thickness and disposed between the reflecting optical section and an exit pupil position at which a principal ray reflected by the reflecting surface and proceeding towards the maximum field angle and the optical axis of the reflecting optical section intersect with each other, and an optical surface of a magnification side of the exit lens has a shape concave towards the magnification side. Either (1) or (2) is selective.

BRIEF DESCRIPTION OF THE DRAWINGS

The invention will now be described with reference to the accompanying figures, wherein like numbers reference like elements.

DESCRIPTION OF EXEMPLARY EMBODIMENTS

First Embodiment

Figure 1:
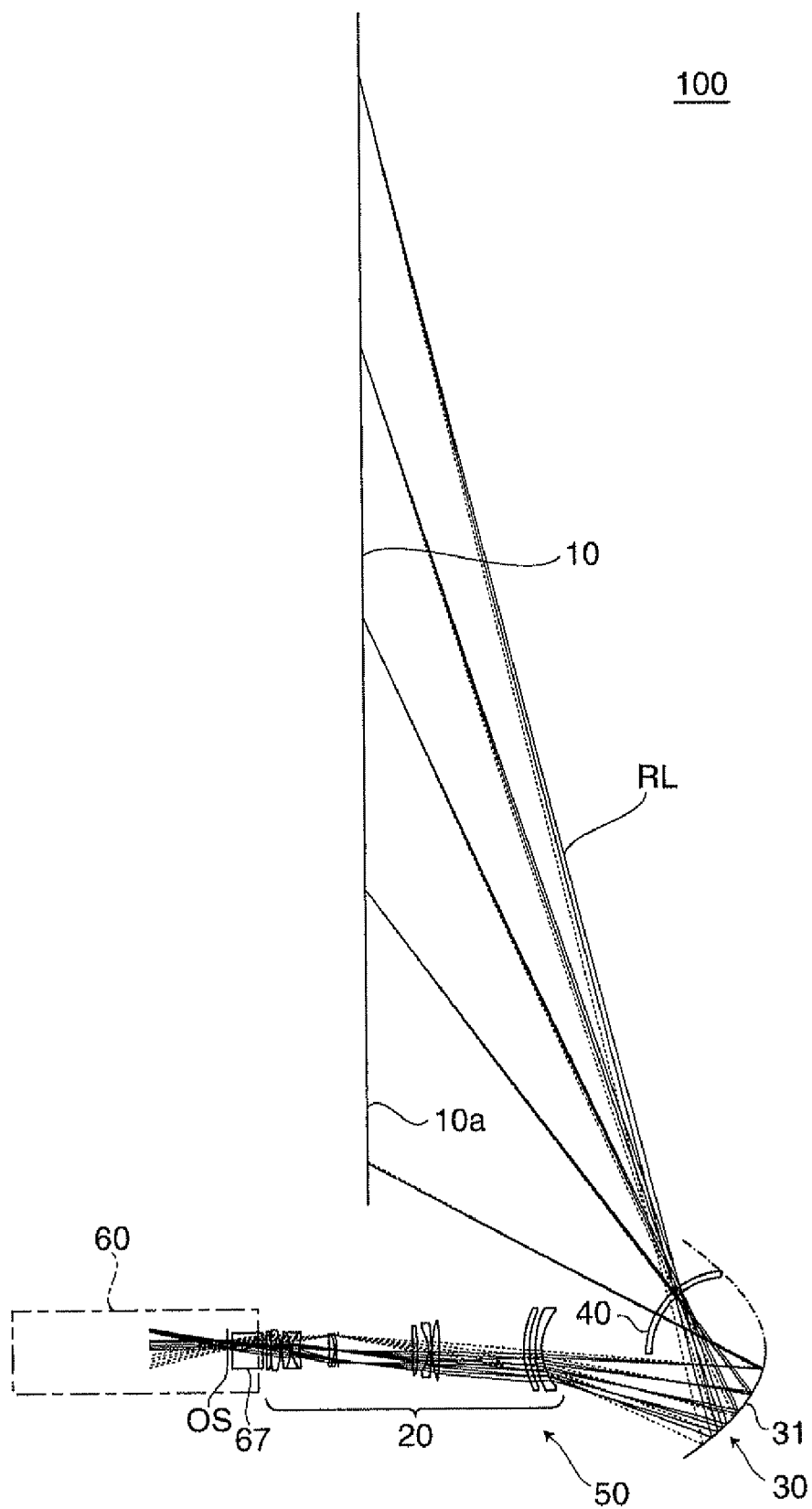
FIG. 1 is a conceptual diagram for explaining a substantial part of a projection type image display device according to a first embodiment.
Figure 2:
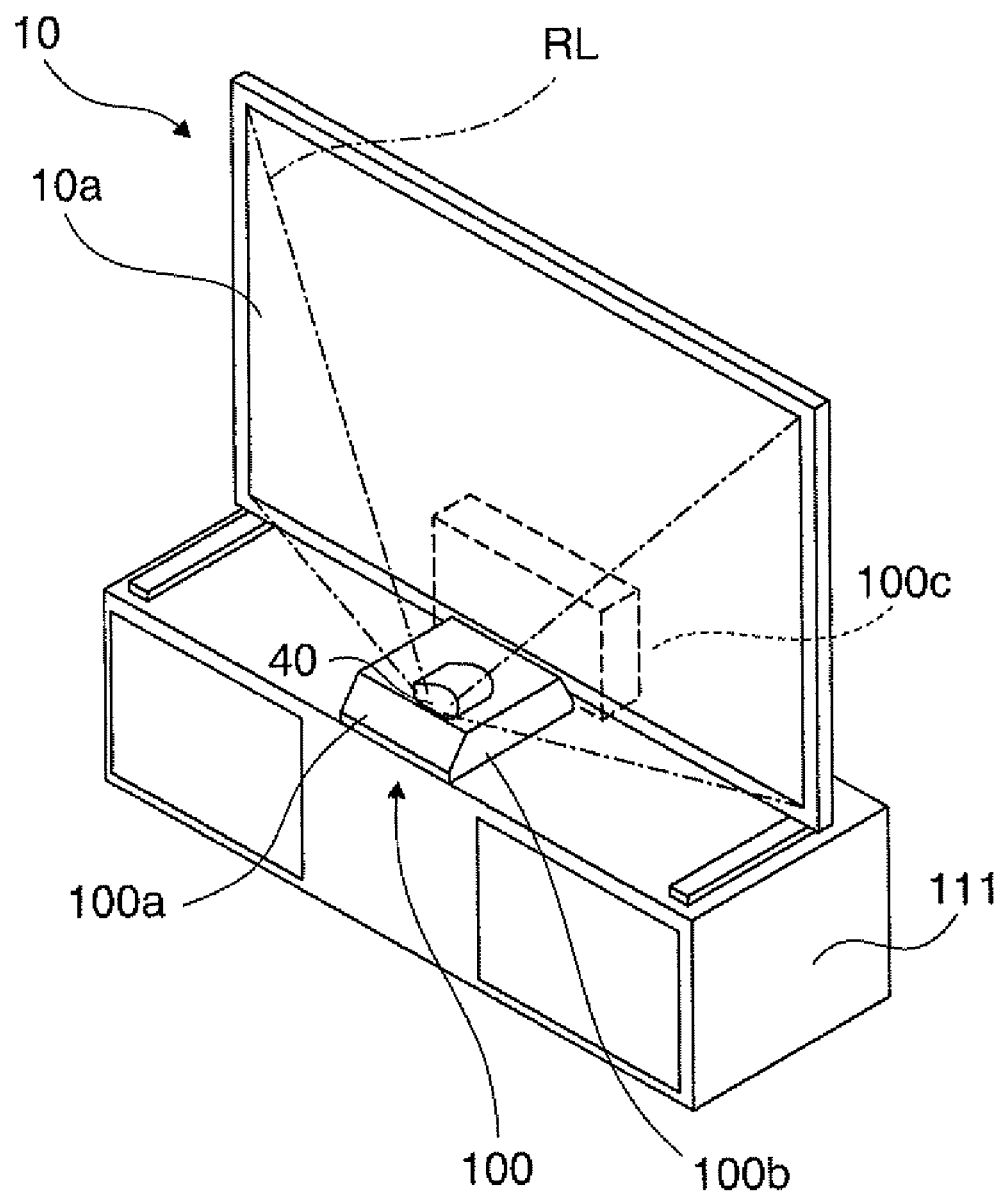
FIG. 2 is a perspective view for explaining an appearance of the projection type image display device shown in FIG. 1.

FIG. 1 is a side view showing a substantial part of an optical system forming a projection type image display device according to the first embodiment of the invention. FIG. 2 is a perspective view for explaining an appearance of the projection type image display device.

The projection type image display device 100 according to the present embodiment has a screen 10, a projection optical system 50, and an image forming optical section 60. Here, the screen 10 is disposed in a posterior stage of the light path, i.e., a magnification side of the projection optical system 50, and the image forming optical section 60 is disposed in an anterior stage of the light path, i.e., a reduction side of the projection optical system 50. It should be noted that in FIG. 1, only a cross dichroic prism 67 is shown as a part of the image forming optical section 60, and details of the other part thereof are omitted. Further, illustration of the projection optical system 50 and the image forming optical section 60 is omitted from FIG. 2 as the condition of being housed in a case 100a as a closed container.

The screen 10 is a reflective projection board, and displays an image by diffuse reflection of the projection light entering the screen projection surface 10a on the front side thereof. The screen 10 is formed, for example, of a white plastic plate. Further, the screen 10 can also be obtained by coating the surface of the substrate with a coating material including beads or pearls or embedded microlenses or micromirrors on the surface of the substrate.

The projection optical system 50 is for enlargedly projecting an image on the object surface OS on the screen projection surface 10a of the screen 10, and the projection optical system 50 comprises a first refracting optical section 20, a reflecting optical section 30, and a second refracting optical section 40 in order from the reduction side. Here, the first refracting optical section 20 is formed of a plurality of lenses, the reflecting optical section 30 has at least one reflecting surface with a concave shape, and the second refracting optical section 40 is formed of one exit lens (specifically, one meniscus lens with a dome shape).

Figure 3:
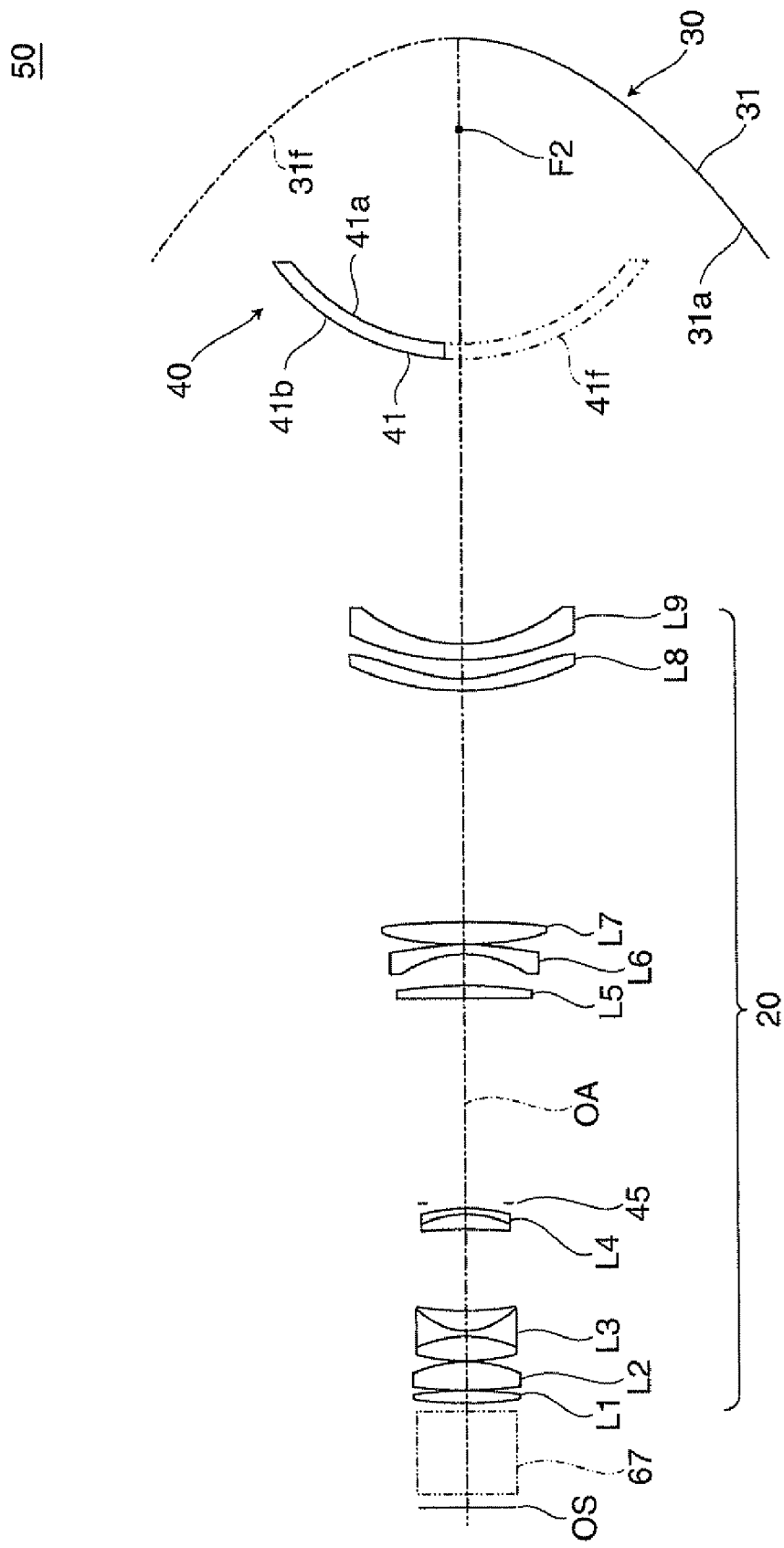
FIG. 3 is a diagram for explaining a configuration of a projection optical system of the projection type image display device.

FIG. 3 is a diagram for explaining a configuration of a projection optical system 50 of the projection type image display device 100. The first refracting optical section 20 is composed of a plurality of refracting lenses disposed along the optical axis OA extending perpendicular to the screen projection surface 10a in an area located below the screen 10.

Hereinafter, a specific lens structure of the first refracting optical section 20 will be explained.

The first refracting optical section 20 shown in FIG. 3 and so on has a first lens L1, a second lens L2, a third lens L3, a fourth lens L4, a fifth lens L5, a sixth lens L6, a seventh lens L7, an eighth lens L8, a ninth lens L9, and an aperture 45.

The lenses L1 through L9 are arranged in order from the first lens L1 to the ninth lens L9 from the object surface OS side, i.e., the reduction side, towards the reflecting optical section 30, i.e., the magnification side. Here, the aperture 45 is disposed between the fourth lens L4 and the fifth lens L5.

The first lens L1 and the eighth lens L8 are aspheric lenses. Further, the second lens L2 is a biconvex lens, the third lens L3 is a convex and concave triple-cemented lens, and the fourth lens L4 is a concave-convex double-cemented lens. Further, the fifth lens L5 and the seventh lens L7 are biconvex lenses. Further, the sixth lens L6 and the ninth lens L9 are meniscus lenses. It should be noted that the arrangement of each of the lenses L1 through L9 is adjusted so that the optimum projection on the screen 10 shown in FIG. 1 can be achieved in relation to the shape and the arrangement of the reflecting optical section 30.

The first refracting optical section 20 is configured to be substantially telecentric on the reduction side, i.e., the object surface OS side. Further, between the first lens L1 as the anterior end of the first refracting optical section 20 and the object surface OS which is provided with a liquid crystal panel, there is disposed the cross dichroic prism 67 for combining the images of three colors. It should be noted that the object surfaces on which the other two liquid crystal panels are to be disposed, although they are not shown in the figure, have an equivalent, namely conjugated arrangement with respect to the object surface OS shown in the figure. In FIG. 1 and so on, a light beam diffused within a certain angular range centered on the principal ray perpendicular to the object surface OS and parallel to the optical axis OA is emitted from each of the object surfaces, and the light beam proceeds to the right in the figure, and then passes through the first refracting optical section 20. Then, the light beam is reflected by the reflecting optical section 30 disposed lower than the optical axis OA, and then enters the second refracting optical section 40 disposed above the optical axis OA (see FIG. 1).

The reflecting optical section 30 is formed of a curved mirror 31. The curved mirror 31 is a concave reflecting mirror formed of a rotational symmetry plane having the optical axis OA as the axis thereof. The curved mirror 31 has a aspheric reflecting optical surface 31a (a part illustrated with the solid line shown in FIG. 3) disposed lower than the optical axis OA, i.e., on the side across the optical axis from the screen 10, and reflects the projection light, which is emitted forward from the first refracting optical section 20, towards the screen projection surface 10a. Here, a part illustrated with the dashed line shown in FIG. 3, i.e., the part above the optical axis OA shows an immaterial curved surface 31f as a virtual extended surface of the curved mirror 31.

The second refracting optical section 40 is formed, for example, of a meniscus lens 41 made of plastic. The meniscus lens 41 is a lens having a concentric sphere shape formed of a pair of spherical surfaces having, for example, the optical axis OA as the axis thereof, and disposed at the posterior stage of the light path from the exit pupil position EP. It should be noted that the exit pupil position EP denotes the position where the principal ray reflected by the reflecting optical section 30 and proceeding towards the maximum field angle intersects with the optical axis OA of, for example, the reflecting optical section 30. The posterior stage of the light path denotes that the lens is disposed on the light exit side (i.e., on the magnification side) relatively downstream therefrom in the proceeding direction of the projection light. Therefore, in the case in which the surface projection type screen 10, for example, is disposed at the posterior stage of the light path from the projection optical system 30, the meniscus lens 41 is automatically disposed between the exit pupil position EP and the screen 10. The meniscus lens 41 has a roughly constant thickness over the length and breadth thereof. The meniscus lens 41 has a refracting optical surfaces 41a, 41b (the part illustrated with the solid line shown in FIG. 3) above the optical axis OA, and transmits the projection light folded by the curved mirror 31 obliquely upward thereon towards the screen projection surface 10a. Here, a part illustrated with the double-dashed line shown in FIG. 3, namely the part under the optical axis OA shows an immaterial part 41f as a virtual extended part of the meniscus lens 41. The meniscus lens 41 is disposed so as to be opposed to the reflecting optical surface 31a of the curved mirror 31. Thus, the meniscus lens 41 can be made to function as a protective cover for the reflecting optical surface 31a, and consequently, for the projection optical system 50. Further, the meniscus lens 41 has a domed outer shape convex towards the posterior stage side of the light path, namely the magnification side. Thus, the meniscus lens 41 can have a smaller size with relative ease compared to the flat cover plate, the strength thereof as the protective cover is easily assured, and the support therefore also becomes simple and secure. Further, since the meniscus lens 41 is disposed roughly along the spherical surface centered on the exit pupil position EP and has a roughly constant thickness, there are few light beams entering with a superficial angle, and an amount of refraction to the incident light can be reduced, thus the influence to the imagery on the screen 10 can be reduced. It should be noted that although it is assumed that the both refracting optical surfaces 41a, 41b forming the meniscus lens 41 are the spherical surfaces in the above explanations, the both refracting optical surfaces 41a, 41b can also be aspheric surfaces for correcting the aberration providing the extent of the aspheric surface is within the range in which the variation in the thickness thereof does not become extremely large.

Figure 4:
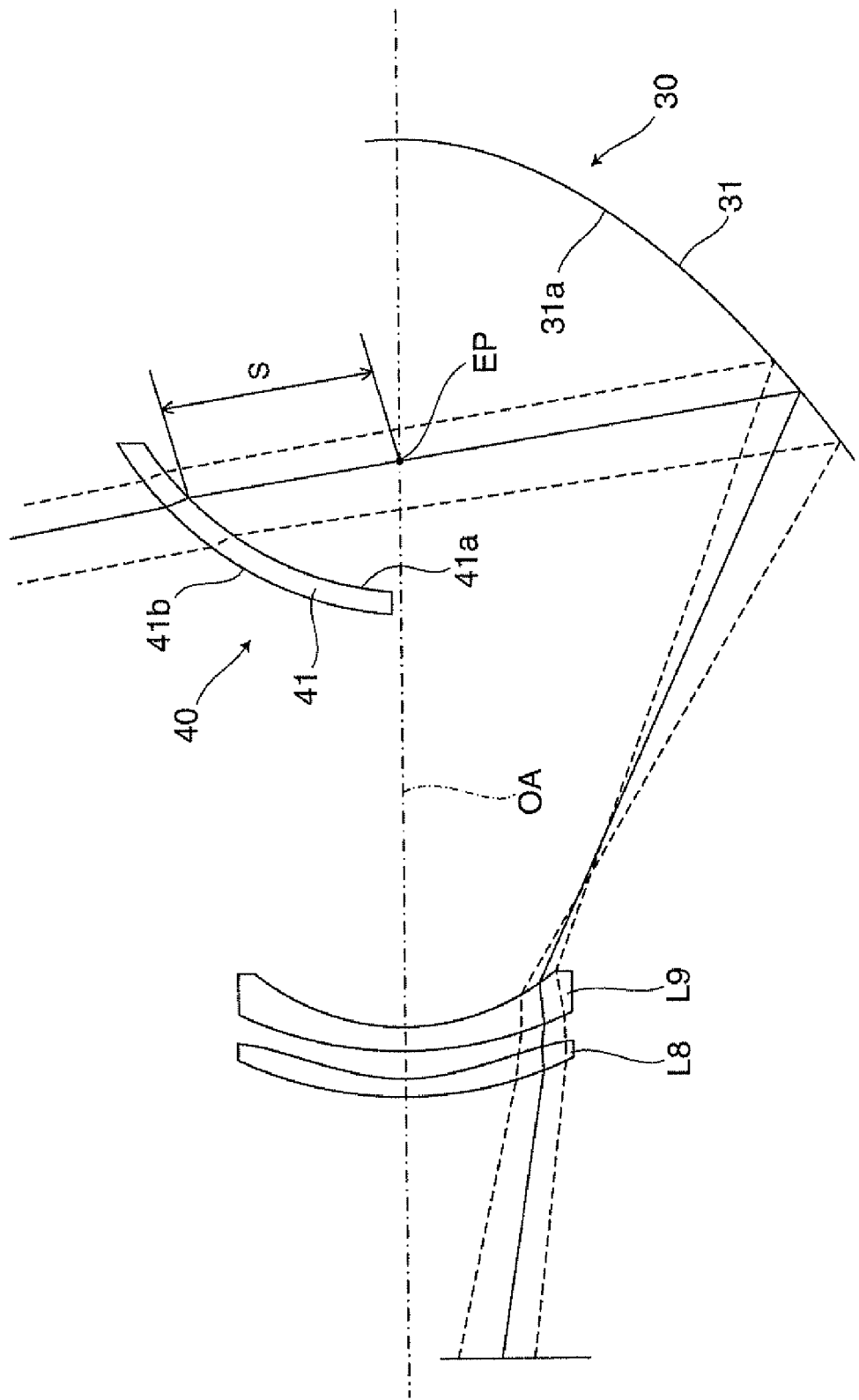
FIG. 4 is an enlarged view for explaining a substantial part of the projection optical system shown in FIG. 3.

FIG. 4 is an enlarged view for explaining a substantial part of the projection optical system 50 of the first embodiment. Here, the meaning of parameter is as follows:

a curvature radius of the curved mirror 31 as a reflecting surface forming the first refracting optical section 20 is Ra, a curvature radius of the entrance optical surface 41a of the meniscus lens 41 as the exit lens forming the second refracting optical section 40 is R2, a curvature radius of the exit optical surface 41b thereof is R1, and a distance between a position (i.e., the exit pupil position EP) where the principal ray reflected by the curved mirror 31 and proceeding towards the maximum field angle intersects with the optical axis OA of the reflecting optical section 30 and so on and a position where the principal ray intersects with the entrance optical surface 41a as the concave surface side in the meniscus lens 41 is S.

In this case, the projection optical system 50 satisfies each of the following conditions.

$$0.2 < |R1/Ra| < 2.0 \quad (1)$$

$$0.7 < R2/R1 < 1.1 \quad (2)$$

$$0.3 < S/R2 < 1.5 \quad (3)$$

In the present projection optical system 50, since it is arranged not to exceed the upper limit of the conditional expression (1) to prevent the shape of the meniscus lens 41 from becoming closer to a plane, it can be prevented that the effective area of the meniscus lens 41 becomes too large in order for including the light beam diffused from the reflecting optical surface 31a with a wide angle, and at the same time, it can also be prevented that the incident angle of the light beam entering the meniscus lens 41 becomes large in the peripheral area of the picture plane to increase the reflectance. On the other hand, in the present projection optical system 50, since it is arranged not to exceed the lower limit of the conditional expression (1) to prevent the curvature radius of the meniscus lens 41 from becoming too small, it can be prevented that the large aberration is generated in the meniscus lens 41 to cause deterioration in performance.

Further, in the present projection optical system 50, since it is arranged that the meniscus lens 41 does not have the positive power beyond the upper limit of the conditional expression (2), it can be prevented that the effect of narrowing the field angle appears to increase the load of the reflecting optical surface 31a. On the other hand, in the present projection optical system 50, since it is arranged that the negative power of the meniscus lens 41 does not become too strong beyond the lower limit of the conditional expression (2), it is possible to prevent that the distortion aberration and the field curvature preferably corrected in the first refracting optical section 20 are deteriorated. Further, since it is prevented that the positive or negative power of the meniscus lens 41 becomes too strong, it can be prevented that the positional accuracy of the arrangement causes deterioration in performance and so on.

In the present projection optical system 50, since it is arranged not to exceed the upper limit of the conditional expression (3) to prevent that the curvature radius of the refracting optical surface 41a of the meniscus 41 becomes too small in comparison with the distance from the focusing position of the reflecting optical surface 31a to the meniscus lens 41, generation of the aberration can be prevented from becoming large. On the other hand, in the present projection optical system 50, since it is arranged not to exceed the lower limit of the conditional expression (3) to prevent that the curvature radius of the refracting optical surface 41a of the meniscus 41 becomes too large in comparison with the distance from the focusing position of the reflecting optical surface 31a to the meniscus lens 41, it can be prevented that the incident angle to the meniscus lens 41 becomes large (steep) in the peripheral area of the screen to increase the reflectance.

Table 1 shows lens data of a specific example of the projection optical system 50 described above and mainly composed of the first refracting optical section 20, the reflecting optical section 30, and the second refracting optical section 40.

TABLE 1

LENS DATA

| SURFACE NUMBER | | R | D | Nd | Nv | |
|---|---|---|---|---|---|---|
| OBJECT SURFACE | | INFINITE | 5.00 | | | |
| 1 | | INFINITE | 27.50 | 1.51680 | 64.2 | PRISM |
| 2 | | INFINITE | 3.00 | | | |
| 3 | ASPHERIC SURFACE | 78.767 | 4.00 | 1.52473 | 56.7 | |
| 4 | ASPHERIC SURFACE | −120.000 | 0.10 | | | |
| 5 | | 137.990 | 9.50 | 1.49700 | 81.6 | |
| 6 | | −40.628 | 0.10 | | | |
| 7 | | 57.396 | 8.00 | 1.48749 | 70.4 | |
| 8 | | −36.316 | 2.00 | 1.81194 | 24.0 | |
| 9 | | 21.287 | 6.50 | 1.76359 | 50.0 | |
| 10 | | 80.365 | 26.69 | | | |
| 11 | | −175.488 | 5.00 | 1.79588 | 25.9 | |
| 12 | | −30.000 | 2.00 | 1.54915 | 45.5 | |
| 13 | | −51.122 | 1.55 | | | |
| APERTURE | | INFINITE | 67.56 | | | |
| 15 | | 730.574 | 4.50 | 1.68845 | 50.2 | |
| 16 | | −118.877 | 10.22 | | | |
| 17 | | −38.904 | 3.00 | 1.85000 | 23.0 | |
| 18 | | −102.113 | 0.27 | | | |
| 19 | | 98.256 | 7.00 | 1.61230 | 35.4 | |
| 20 | | −273.663 | 76.70 | | | |
| 21 | ASPHERIC SURFACE | 90.705 | 4.00 | 1.52473 | 56.7 | |
| 22 | ASPHERIC SURFACE | 45.100 | 6.64 | | | |
| 23 | | 90.833 | 5.00 | 1.81180 | 25.3 | |
| 24 | | 51.694 | 199.16 | | | |
| 25 | ASPHERIC SURFACE | −59.882 | −100.00 | REFLECTING SURFACE | | CURVED MIRROR |
| 26 | | 70.000 | −5.00 | 1.52473 | 56.7 | |
| 27 | | 75.000 | −250.00 | | | |
| SCREEN | | INFINITE | 0.00 | | | |

ASPHERIC SURFACE COEFFICIENT

| SURFACE NUMBER | K | A04 | A06 | A08 | A10 | A12 |
|---|---|---|---|---|---|---|
| 3 | 0.0000E+00 | −1.2349E−05 | 1.5332E−09 | 0.0000E+00 | 0.0000E+00 | 0.0000E+00 |
| 4 | 0.0000E+00 | 0.0000E+00 | 0.0000E+00 | 0.0000E+00 | 0.0000E+00 | 0.0000E+00 |
| 21 | 0.0000E+00 | 1.1280E−06 | 2.5645E−10 | −2.6807E−13 | −2.6650E−16 | 0.0000E+00 |
| 22 | 0.0000E+00 | −6.6621E−06 | 2.9220E−09 | −1.8263E−12 | 0.0000E+00 | 0.0000E+00 |
| 25 | −1.9765E+00 | −1.9217E−07 | 3.7303E−12 | 7.9640E−17 | −2.0731E−20 | 0.0000E+00 |

In the upper part of the Table 1, "SURFACE NUMBER" denotes the number assigned to each of the surfaces of the lenses in order from the object surface OS side. Further, "R" represents the curvature radius, and "D" represents a lens thickness or an air gap with the subsequent surface. Further, "Nd" represents the refractive index in the d-line of the lens material, and "Nv" represents the Abbe constant in the d-line of the lens material.

In the present embodiment, the lenses L1 through L9 are basically formed as spherical surface, further, the entrance and exit surfaces (the surfaces 3 and 4 in the Table 1) of the first lens L1 and the entrance and exit surfaces (the surfaces 21 and 22 in the Table 1) of the eighth lens L8 are formed as aspheric surfaces. Further, the reflecting optical surface 31a (the surface 25 in the Table 1) of the curved mirror 31 is formed as aspheric surface. The displacement x from the surface peak in the optical axis direction in these aspheric shapes can be represented by the following formula assuming that c represents the inverse of a paraxial curvature radius, h represents a height from the optical axis, k represents a conic coefficient, A04 through A12 represent higher order aspheric surface coefficients. In the case with the present embodiment, the respective coefficients "k" and "A04" through "A12" in the aspheric formula described above are as shown in the lower part of the Table 1.

$$x = \frac{c \cdot h^2}{1 + \sqrt{1 - (1+k) \cdot c^2 \cdot h^2}} + A04 \cdot h^4 + A06 \cdot h^6 + A08 \cdot h^8 + A10 \cdot h^{10} + A12 \cdot h^{12}$$

Table 2 shows a result obtained by applying the specific example shown in the Table 1 to the conditional expressions (1) through (3). As is clear from the Table 2 described below, the specific example shown in Table 1 satisfies all of the conditional expressions (1) through (3) described above.

TABLE 2

| PARAMETER | | VALUE APPLIED IN SPECIFIC EXAMPLE |
| --- | --- | --- |
| CURVED MIRROR | Ra | −59.882 |
| CURVED COVER | CONVEX SURFACE R1 | 75.000 |
| (MENISCUS) | CONCAVE SURFACE R2 | 70.000 |
| MAXIMUM FIELD ANGLE | | 79.086 |
| DISTANCE | S | 47.460 |
| (1) \|R1/Ra\| | | 1.252 |
| (2) R2/R1 | | 0.933 |
| (3) S/R2 | | 0.678 |

Figure 5:
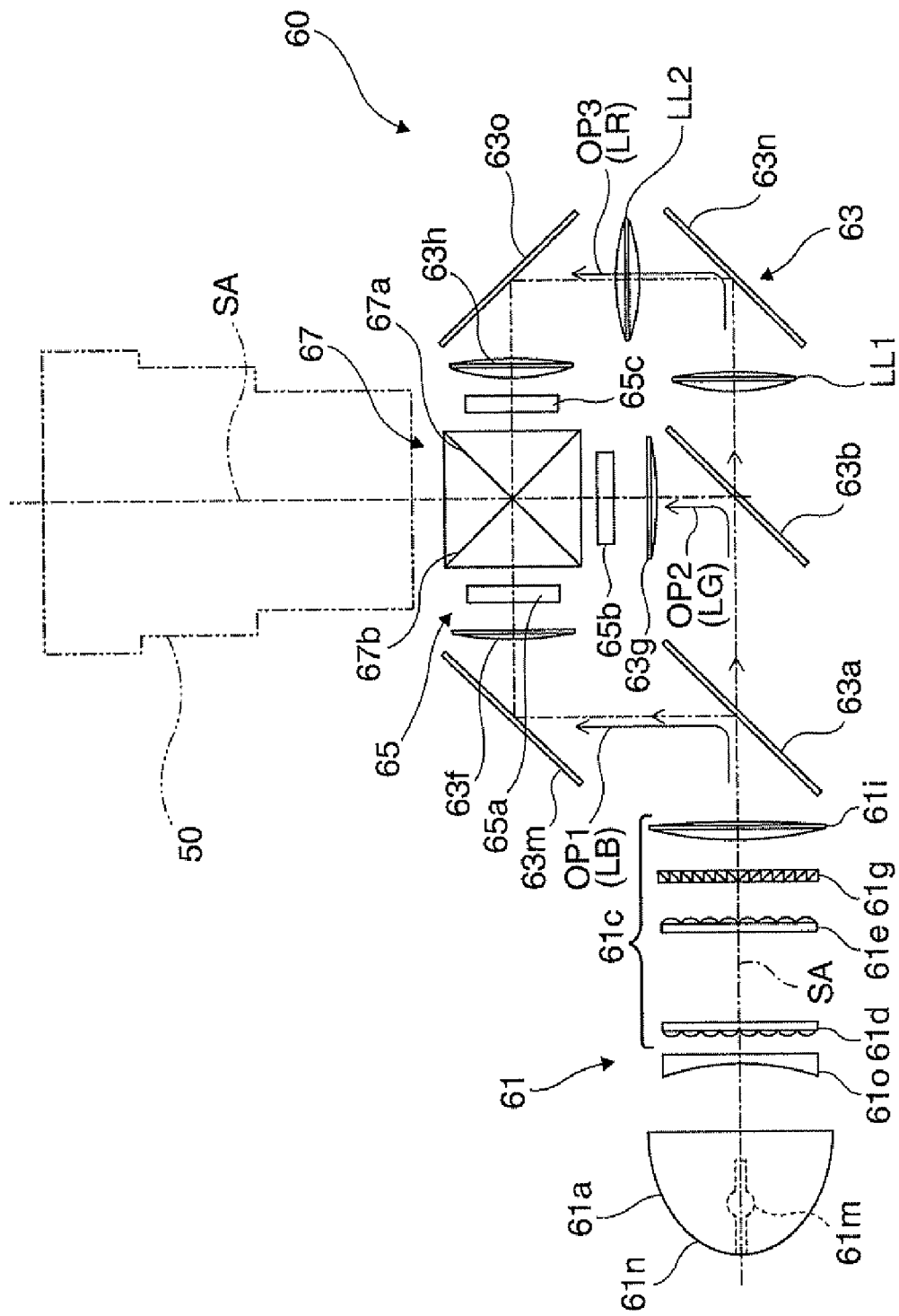
FIG. 5 is a conceptual diagram for explaining an image forming optical section.

FIG. 5 is a conceptual diagram of the image forming optical section 60. The image forming optical section 60 has a light source device 61 for emitting homogenized light source light along the system optical axis SA, an illumination separation system 63 for separating the illumination light emitted from the light source device 61 into three colors of red, green, and blue, a light modulation section 65 illuminated by the illumination light of each color emitted from the illumination separation system 63, and a cross dichroic prism 67 for recombining the modulated light beams of respective colors transmitted through the light modulation section 65. The image light emitted via the cross dichroic prism 67 is projected via the first refracting optical section 20 and so on of the projection optical system 50.

Here, the light source device 61 has a light source unit 61a for emitting the source light and a homogenizing optical system 61c for converting the source light emitted from the light source unit 61a into the illumination light, which is homogenized and a predetermined polarization direction. The light source unit 61a has a light source lamp 61m and a reflector 61n. Further, the homogenizing optical system 61c has a first lens array 61d for dividing the source light into partial light beams, a second lens array 61e for adjusting the diffusion of the partial light beams thus divided, a polarization conversion device 61g for aligning the polarization directions of the respective partial light beams, and a overlapping lens 61i for making the respective partial light beams enter a target illumination area in an overlapping manner.

The illumination separation system 63 has first and second dichroic mirrors 63a, 63b, and mirrors 63m, 63n, and 63o for folding the light path. The illumination separation system 63 branches the system light axis SA into three light paths OP1 through OP3, thereby separating the illumination light into three light beams of a blue light beam LB, a green light beam LG, and a red light beam LR. It should be noted that the relay lenses LL1, LL2 transmits an image formed right before the first relay lens LL1 on the entrance side substantially directly to the field lens 63h on the exit side, thereby preventing efficiency decrease of the light beam caused, for example, by diffusion of the light beam.

The light modulation section 65 has three liquid crystal light valves 65a, 65b, and 65c the three colors of the illumination light beams LB, LG, and LR input, respectively, and performs intensity modulation of each of the pixels on the respective colored light beams LB, LG, and LR entering the liquid crystal light valves 65a, 65b, and 65c via the field lenses 63f, 63g, and 63h, respectively, in accordance with the drive signal. It should be noted that each of the liquid crystal light valves 65a, 65b, and 65c is an image forming element having a structure of sandwiching a liquid crystal panel between a pair of polarization plates. Further, the liquid crystal panel forming each of the liquid crystal light valves 65a, 65b, and 65c are arranged to correspond to the object surface OS shown in FIG. 1 and so on.

The cross dichroic prism 67 has dichroic films 67a, 67b intersecting with each other, and emits the image light obtained by combining the modulated light beams from the respective light valves 65a, 65b, and 65c. The image light thus re-combined by the cross dichroic prism 67 is projected on the screen 10 not shown in FIG. 5 as a color image with an appropriate magnification by the projection optical system 50 as the projection lens.

Going back to FIG. 2, an installation example of the projection type image display device 100 described above will be explained. The optical system of the projection type image display device 100 is housed in the case 100a, and is fixed on a rack 111 together with the screen 10. The projection section 100b is disposed below the screen 10 on the rack 111, the main section 100c is disposed on the rear side of the lower part of the screen 10, and the projection light RL is projected on the screen projection surface 10a from below and close to the screen 10. Here, the projection section 100b houses the projection optical system 50 shown in FIG. 3 and so on, and the main section 100c houses the image forming optical section 60 and so on.

Figure 6:
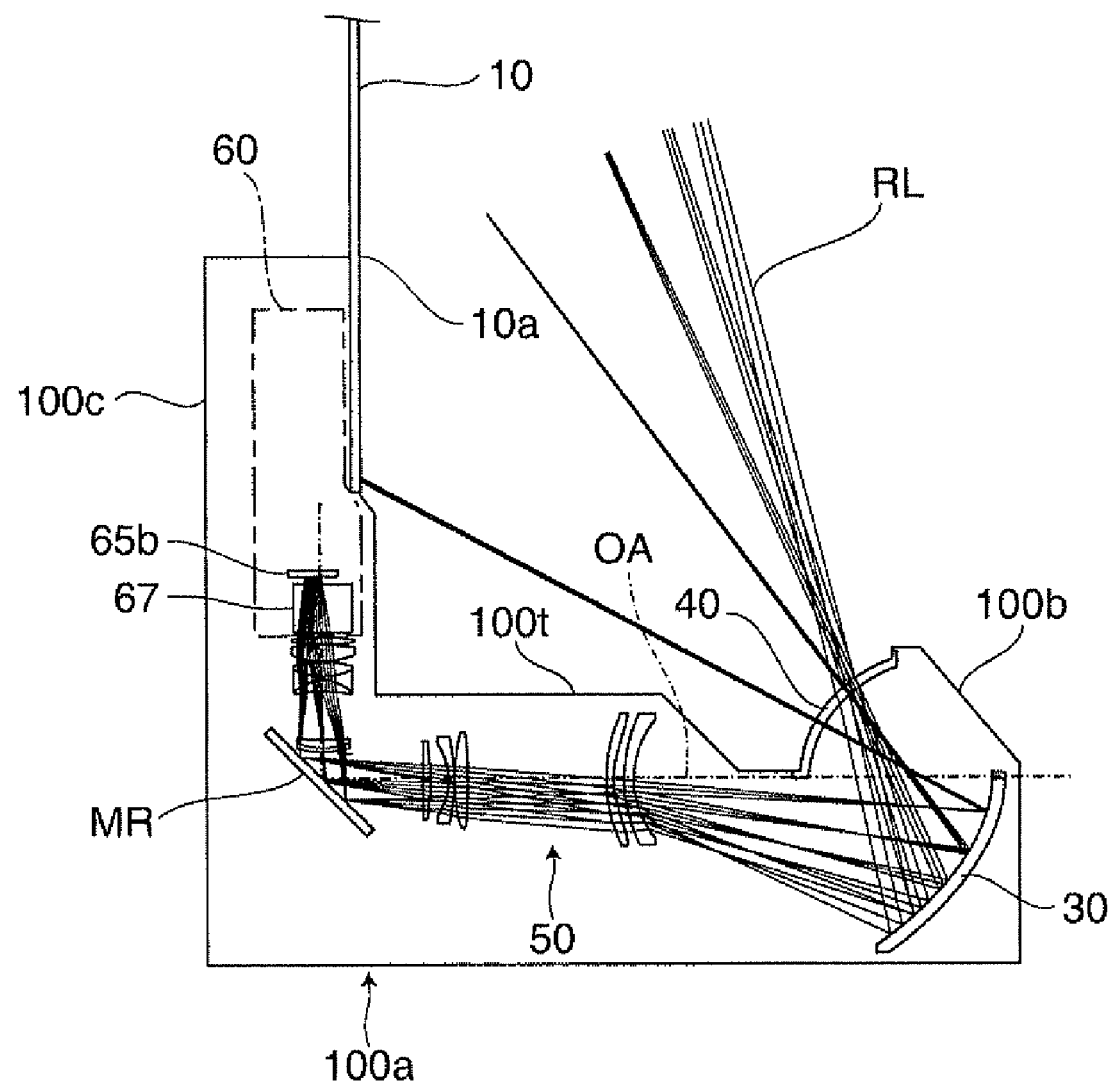
FIG. 6 is a cross-sectional view for explaining an arrangement of the projection optical system and so on in a case.

FIG. 6 is a cross-sectional view for explaining a specific example of the arrangement of the projection optical system 50 and so on in the case 100a. In the projection optical system 50, the first refracting optical section 20 is mainly housed in the projection section 100b and is disposed under the screen 10. In this case, the light path of the first refracting optical section 20 is folded by a mirror MR in consideration of the housing space. The first refracting optical section 20 has a part of the reduction side extending in a vertical direction parallel to the screen projection surface 10a of the screen 10 and a part of the magnification side extending in a horizontal direction perpendicular to the screen projection surface 10a. The reflecting optical section 30 is housed in the projection section 100b, and is disposed on and fixed to the leading end side (i.e., the magnification side) of the first refracting optical section 20. The second refracting optical section 40 is fitted in a top panel loot of the projection section 100b to be fixed thereto, and is disposed on and fixed to an area above the reflecting optical section 30 (i.e., the magnification side of the reflecting optical section 30). It should be noted that the first refracting optical section 20 is made of plastic and has not only easy to process the domed shape with a constant thickness, but also sufficient strength.

As is clear from the explanation described above, according to the projection type image display device 100 of the present embodiment, since the refracting optical surface 41b on the magnification side of the meniscus lens 41 has the shape convex towards the magnification side in the second refracting optical section 40, it becomes possible to make the second refracting optical section 40 to function as the protective cover for the projection optical system 50 even in the case in which the projection is performed with the wide field angle. On this occasion, since the meniscus lens 41 becomes to have the shape convex towards the magnification side with roughly a constant thickness, it becomes possible to realize a small-sized protective cover, and to reduce the influence to the image quality. Further, since the meniscus lens 41 has the domed shape with a concentric sphere shape having the center of curvature of the lens surface in the vicinity of the exit pupil position EP, it becomes possible to reduce the influence of the meniscus lens 41 to deterioration in image quality in relation to the fact that the projection light reflected by the curved mirror 31 of the reflecting optical section 30 has a high tendency to pass through the exit pupil position EP and the vicinity thereof. Further, since the incident angles of the light beams entering the meniscus lens 41 become nearly perpendicular to the surface irrespective of the directions of the light beams, reflection in particular in the peripheral area can effectively be suppressed, thus the increase in the light intensity in the peripheral area of the projection image can be achieved.

Second Embodiment

Figure 7:
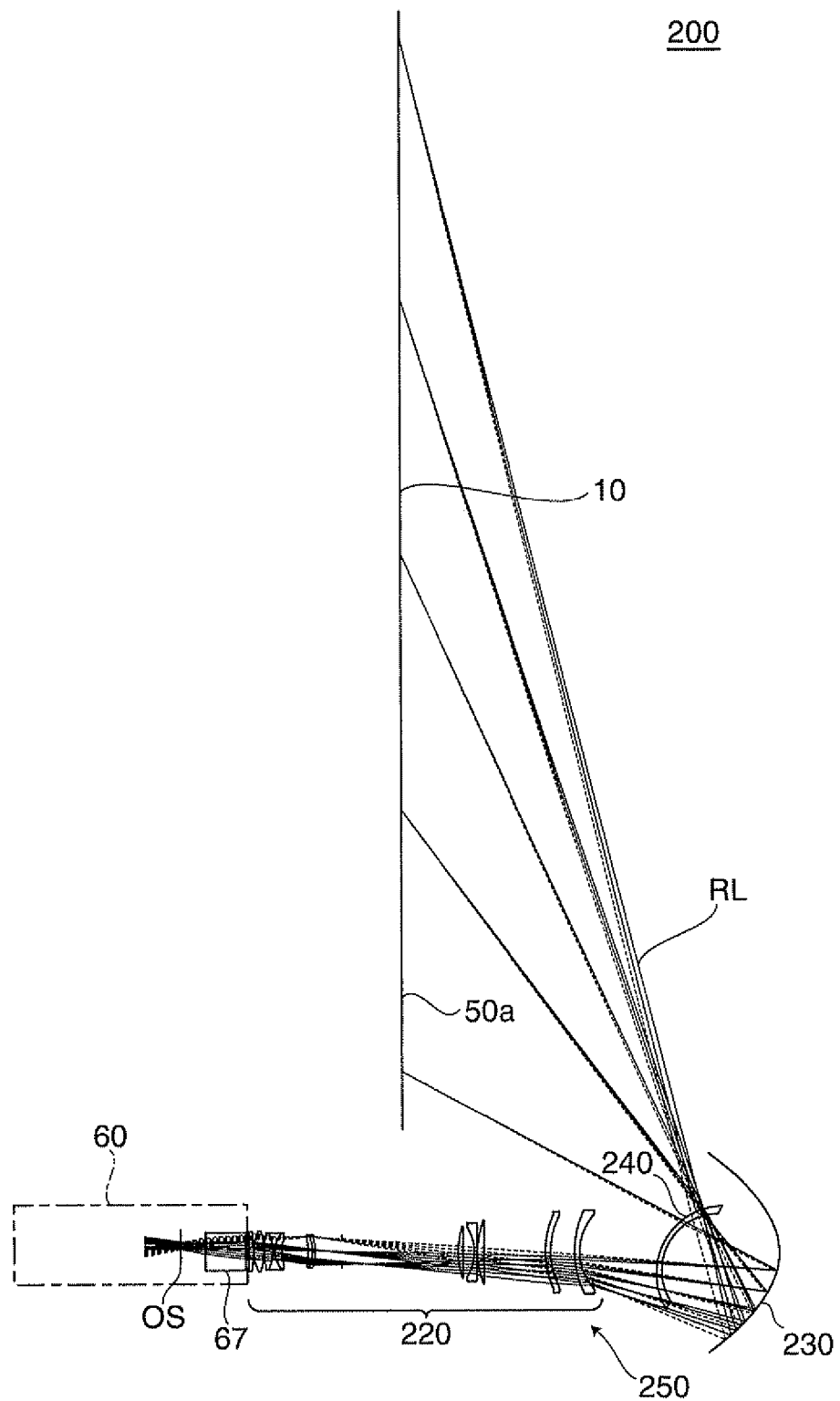
FIG. 7 is a conceptual diagram for explaining a substantial part of a projection type image display device according to a second embodiment.
Figure 8:
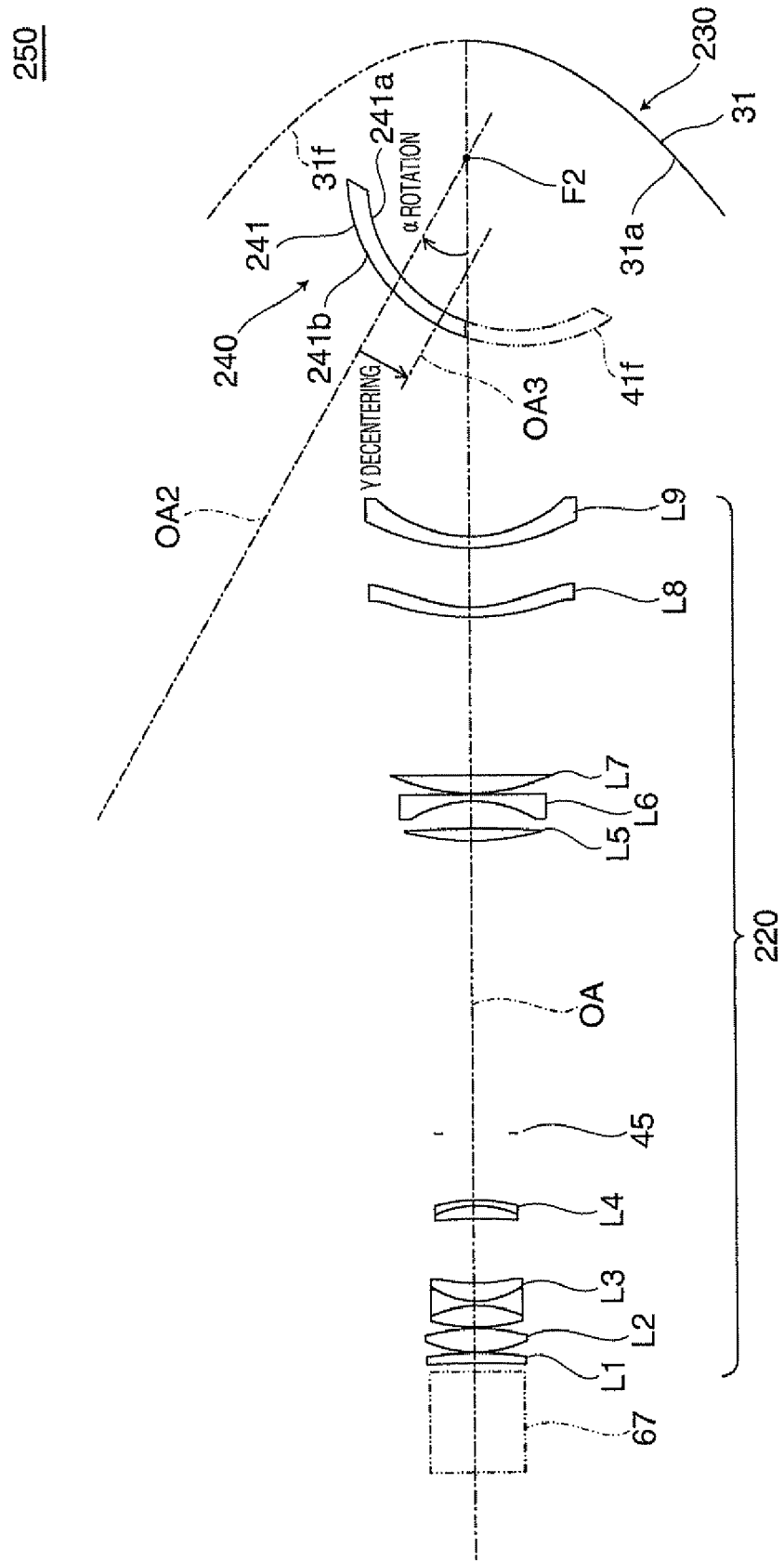
FIG. 8 is a diagram for explaining a configuration of a projection optical system of the projection type image display device shown in FIG. 7.
Figure 9:
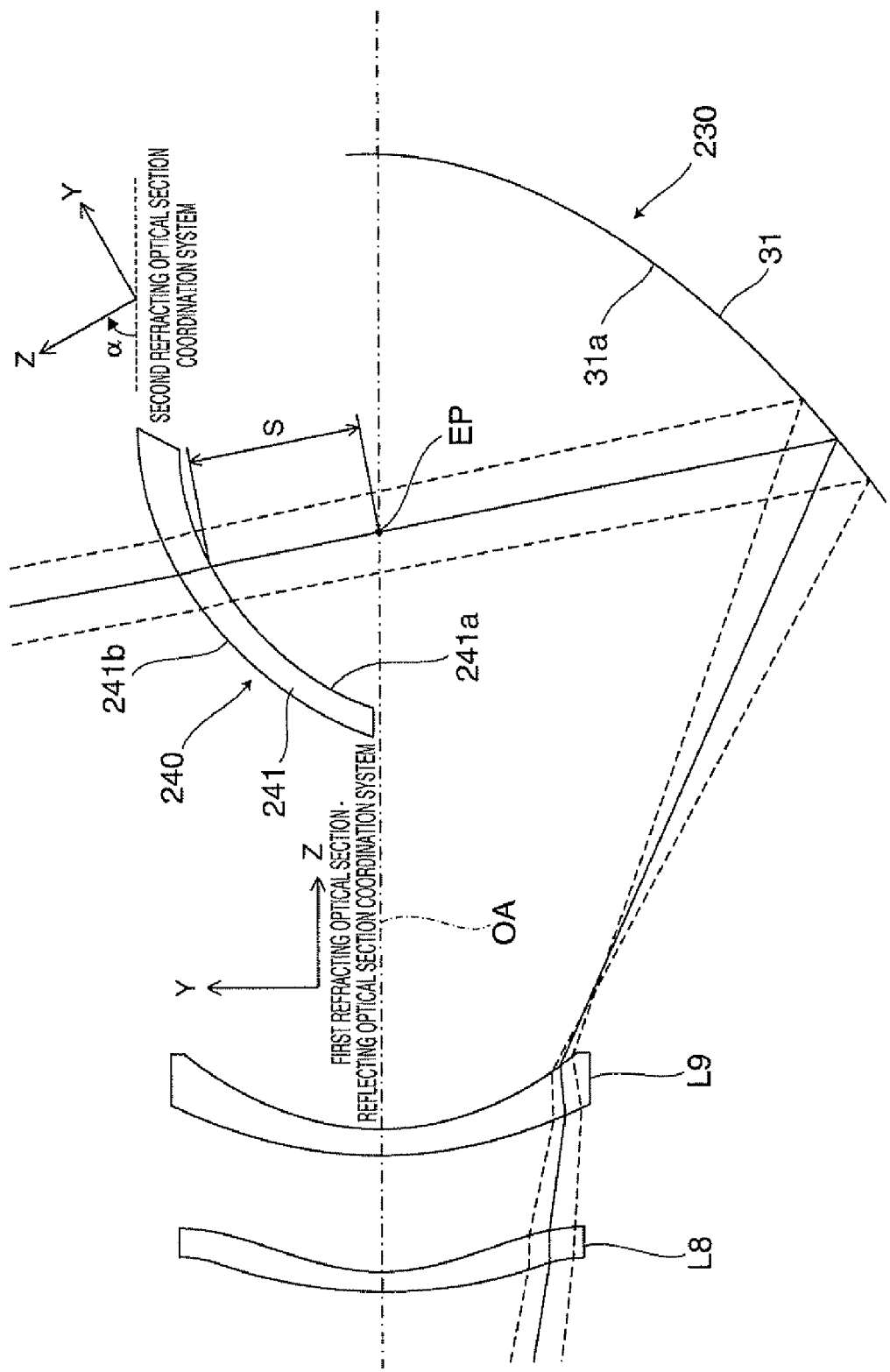
FIG. 9 is an enlarged view for explaining a substantial part of the projection optical system shown in FIG. 8.

FIG. 7 is a side view showing a substantial part of an optical system forming a projection type image display device according to a second embodiment, and FIG. 8 is a diagram for explaining a configuration of a projection optical system of the projection type image display device. Further, FIG. 9 is an enlarged view for explaining a substantial part of the projection optical system.

The projection type image display device 200 according to the present embodiment is obtained by modifying the projection type image display device 100 of the first embodiment shown in FIG. 1 and so on, and the sections not particularly explained have the same structure as the projection type image display device 100 of the first embodiment.

The projection type image display device 200 according to the present embodiment comprises the screen 10, a projection optical system 250, and the image forming optical section 60. The projection optical system 250 comprises a first refracting optical section 220, a reflecting optical section 230, and a second refracting optical section 240 in order from the reduction side.

The first refracting optical section 220 comprises the first lens L1, the second lens L2, the third lens L3, the fourth lens L1, the fifth lens L5, the sixth lens L6, the seventh lens L7, the eighth lens L8, the ninth lens L9, and the aperture 45. The reflecting optical section 230 has at least one curved mirror 31. The second refracting optical section 240 is formed of a meniscus lens 241. The meniscus lens 241 is a slightly negative lens having spherical refracting optical surfaces 241a, 241b only above the optical axis OA. The optical axis OA3 of the meniscus lens 241 is held in a tilted condition in which the optical axis OA3 is rotated α° clockwise around the vicinity of the focal position F2 of the curved mirror 31 with respect to the optical axis OA of the first refracting optical section 220 and the reflecting optical section 230. Further, the optical axis OA3 is decentered downward from the optical axis OA2 thus tilted to have a distance Y with the optical axis OA2. The meniscus lens 241 is disposed so as to be opposed to the reflecting optical surface 31a of the curved mirror 31, and has a domed outer shape convex towards the posterior stage side of the light path (i.e., the magnification side). Thus, the meniscus lens 241 becomes a relatively small-sized protective cover for the projection optical system 250 having a relatively small influence to the image quality. Further, the meniscus lens 241 becomes a small-sized protective cover the strength of which can easily be assured, and which can easily and surely be supported.

Since in the projection optical system of this kind, the light beam reflected by the curved mirror returns to a first optical system in the center of the optical axis, the off-axis performance in the extent in which the interference with the first optical system does not occur is assured, and there is no need to assure the performance thereof in the vicinity of the optical axis. In such case, by decentering the meniscus lens 241, it becomes possible to efficiently correct the off-axis performance. On this occasion, by providing the meniscus lens 241 with slight power, it becomes possible to achieve the correction effect. Further, by making the refracting optical surface 241a, 241b to have aspheric surfaces, it becomes also possible to achieve the similar correction effect.

Table 3 below shows lens data of the projection optical system 250 which is described above and has the first refracting optical section 220, the reflecting optical section 230, and the second refracting optical section 240:

TABLE 3

| LENS DATA | | | | | |
|---|---|---|---|---|---|
| SURFACE NUMBER | | R | D | Nd | Nv |
| OBJECT SURFACE | | INFINITE | 23.00 | | |
| 1 | | INFINITE | 38.00 | 1.51680 | 64.2 PRISM |
| 2 | | INFINITE | 3.00 | | |
| 3 | ASPHERIC SURFACE | −6747.433 | 4.00 | 1.52473 | 56.7 |
| 4 | | −120.000 | 0.10 | | |
| 5 | | 45.612 | 9.50 | 1.49700 | 81.6 |
| 6 | | −65.431 | 0.10 | | |
| 7 | | 65.719 | 8.00 | 1.48749 | 70.4 |
| 8 | | −40.127 | 2.00 | 1.84666 | 23.8 |
| 9 | | 30.449 | 6.50 | 1.62041 | 60.3 |
| 10 | | 59.953 | 24.27 | | |
| 11 | | −492.354 | 5.00 | 1.76182 | 26.6 |
| 12 | | −30.000 | 2.00 | 1.58913 | 61.3 |

TABLE 3-continued

| | | | | | |
|---|---|---|---|---|---|
| 13 | | −64.320 | 25.14 | | |
| APERTURE | | INFINITE | 110.95 | | |
| 15 | | 99.897 | 4.50 | 1.67270 | 32.2 |
| 16 | | −558.153 | 10.06 | | |
| 17 | | −46.639 | 3.00 | 1.84666 | 23.8 |
| 18 | | −2046.421 | 0.10 | | |
| 19 | | 72.732 | 7.00 | 1.56732 | 42.8 |
| 20 | | −1702.465 | 59.14 | | |
| 21 | ASPHERIC SURFACE | 90.541 | 4.00 | 1.52473 | 56.7 |
| 22 | ASPHERIC SURFACE | 45.426 | 22.09 | | |
| 23 | | 81.756 | 5.00 | 1.62041 | 60.3 |
| 24 | | 54.409 | 186.56 | | |
| 25 | ASPHERIC SURFACE | −58.425 | −100.00 | REFLECTING SURFACE | CURVED MIRROR |
| 26 | | INFINITE | 55.00 | | |
| 27 | | INFINITE | −55.00 | | α ROTATION |
| 28 | | 55.000 | −5.00 | 1.52473 56.7 | Y DECENTERING |
| 29 | | 65.000 | 0.00 | | |
| 30 | | INFINITE | 60.00 | | Y DECENTERING |
| 31 | | INFINITE | −60.00 | | α ROTATION |
| 32 | | INFINITE | −250.00 | | |
| SCREEN | | INFINITE | 0.00 | | |

ASPHERIC SURFACE COEFFICIENT

| SURFACE NUMBER | K | A04 | A06 | A08 | A10 | A12 |
|---|---|---|---|---|---|---|
| 3 | 0.0000E+00 | −2.7080E−06 | −6.8661E−10 | 0.0000E+00 | 0.0000E+00 | 0.0000E+00 |
| 21 | 0.0000E+00 | −8.5562E−08 | 5.1467E−10 | −4.6529E−13 | −1.7147E−16 | 0.0000E+00 |
| 22 | 0.0000E+00 | −6.2958E−06 | 2.5248E−09 | −1.5924E−12 | 0.0000E+00 | 0.0000E+00 |
| 25 | −2.1095E+00 | −1.9959E−07 | 4.1584E−12 | 9.8699E−17 | −2.3789E−20 | 0.0000E+00 |

Further, the Table 4 below collectively shows the tilt and decentering of the meniscus lens 241 as a list.

TABLE 4

| AMOUNT OF DECENTERING SURFACE NUMBER | Y DECENTERING | α ROTATION |
|---|---|---|
| 27 | 0.000 | −28.000 |
| 28 | −20.000 | 0.000 |
| 30 | 20.000 | 0.000 |
| 31 | 0.000 | 28.000 |

In the present embodiment, although the lenses L1 through L9 are basically formed as spherical surface, the entrance surface (surfaces 3 in the Table 3) of the first lens L1 and the entrance and exit surfaces (surfaces 21 and 22 in the Table 3) of the eighth lens L8 are formed as aspheric surfaces. Further, the reflecting optical surface 31a (the surface 25 in the Table 3) of the curved mirror 31 is formed as aspheric surface.

Table 5 shows a result obtained by applying the specific example shown in the Table 3 to the conditional expressions (1) through (3) described in the first embodiment. As is clear from the Table 5 described below, the specific example shown in Table 3 satisfies all of the conditional expressions (1) through (3) described above.

TABLE 5

| PARAMETER | | VALUE APPLIED IN SPECIFIC EXAMPLE |
|---|---|---|
| CURVED MIRROR | Ra | −58.425 |
| CURVED COVER (MENISCUS) | CONVEX SURFACE R1 | 65.000 |
| | CONCAVE SURFACE R2 | 55.000 |

TABLE 5-continued

| PARAMETER | VALUE APPLIED IN SPECIFIC EXAMPLE |
|---|---|
| MAXIMUM FIELD ANGLE | 79.067 |
| DISTANCE S | 32.291 |
| (1) |R1/Ra| | 1.113 |
| (2) R2/R1 | 0.846 |
| (3) S/R2 | 0.587 |

In the present embodiment, the projection light projected from the image forming optical section 60 is transmitted through the first refracting optical section 220, then folded by the reflecting optical section 230, and then emitted towards the screen 10 from the second refracting optical section 240 in the projection optical system 250. The projection light emitted from the projection optical system 250 is projected on the screen projection surface 10a with a desired magnification.

Third Embodiment

Figure 10:
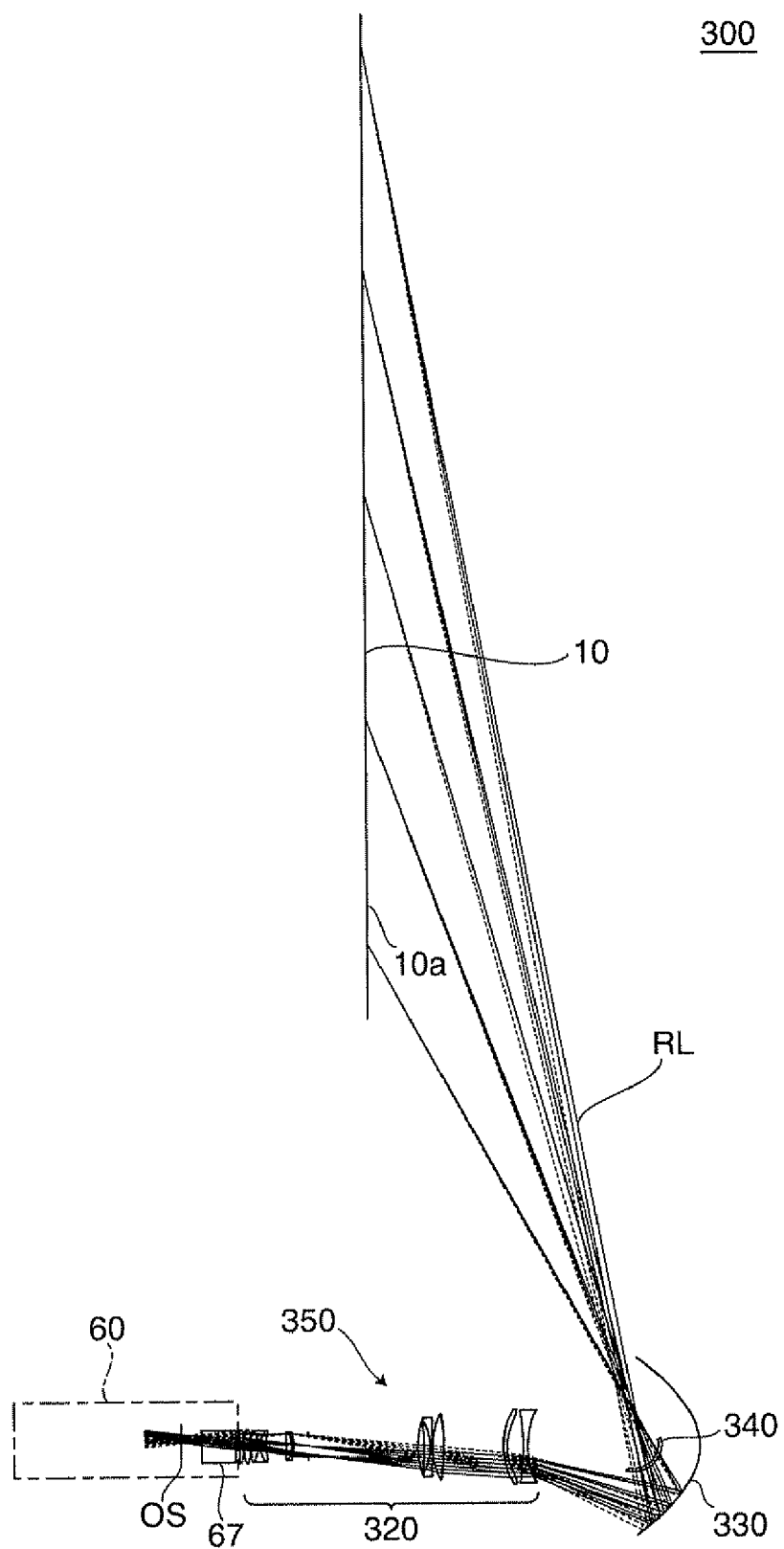
FIG. 10 is a conceptual diagram for explaining a substantial part of a projection type image display device according to a third embodiment.
Figure 11:
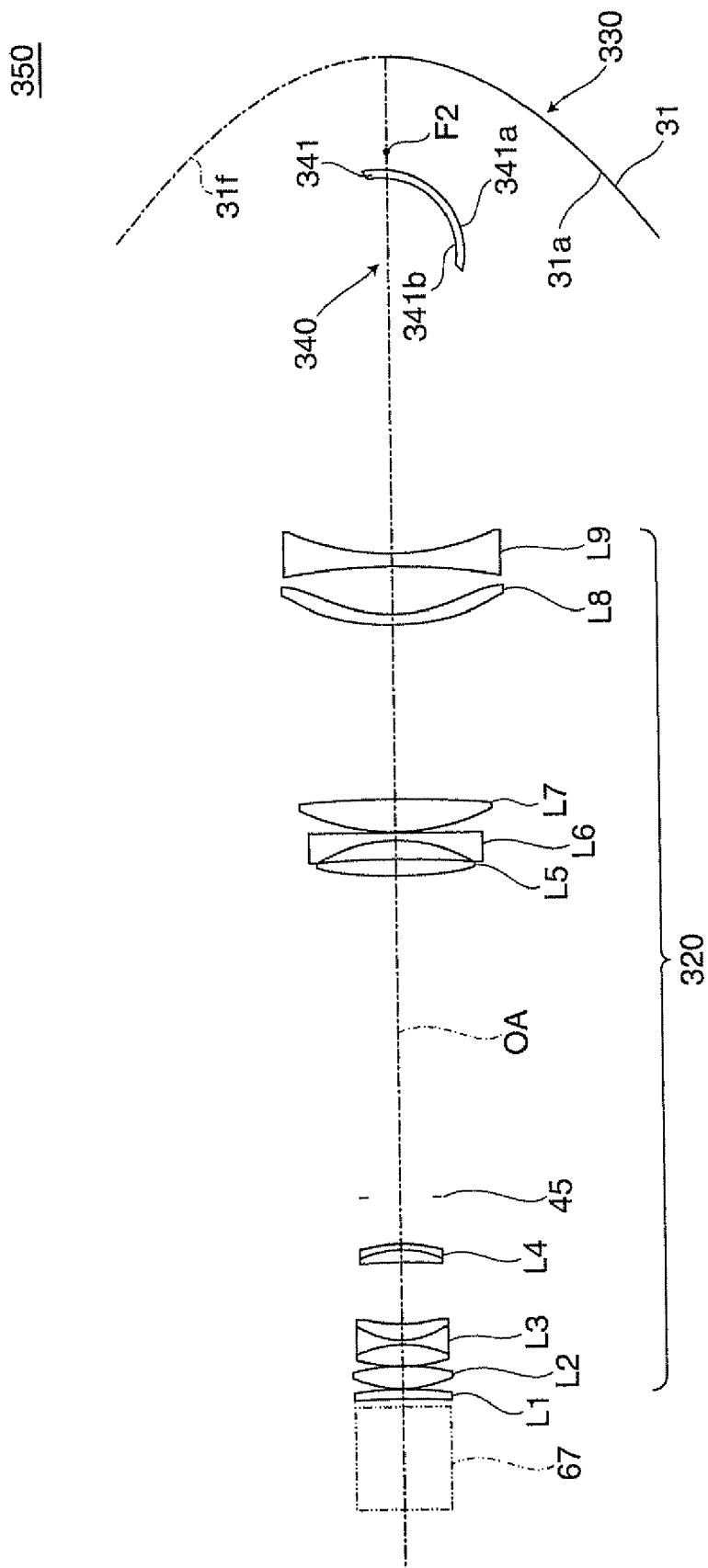
FIG. 11 is a diagram for explaining a configuration of a projection optical system of the projection type image display device shown in FIG. 10.
Figure 12:
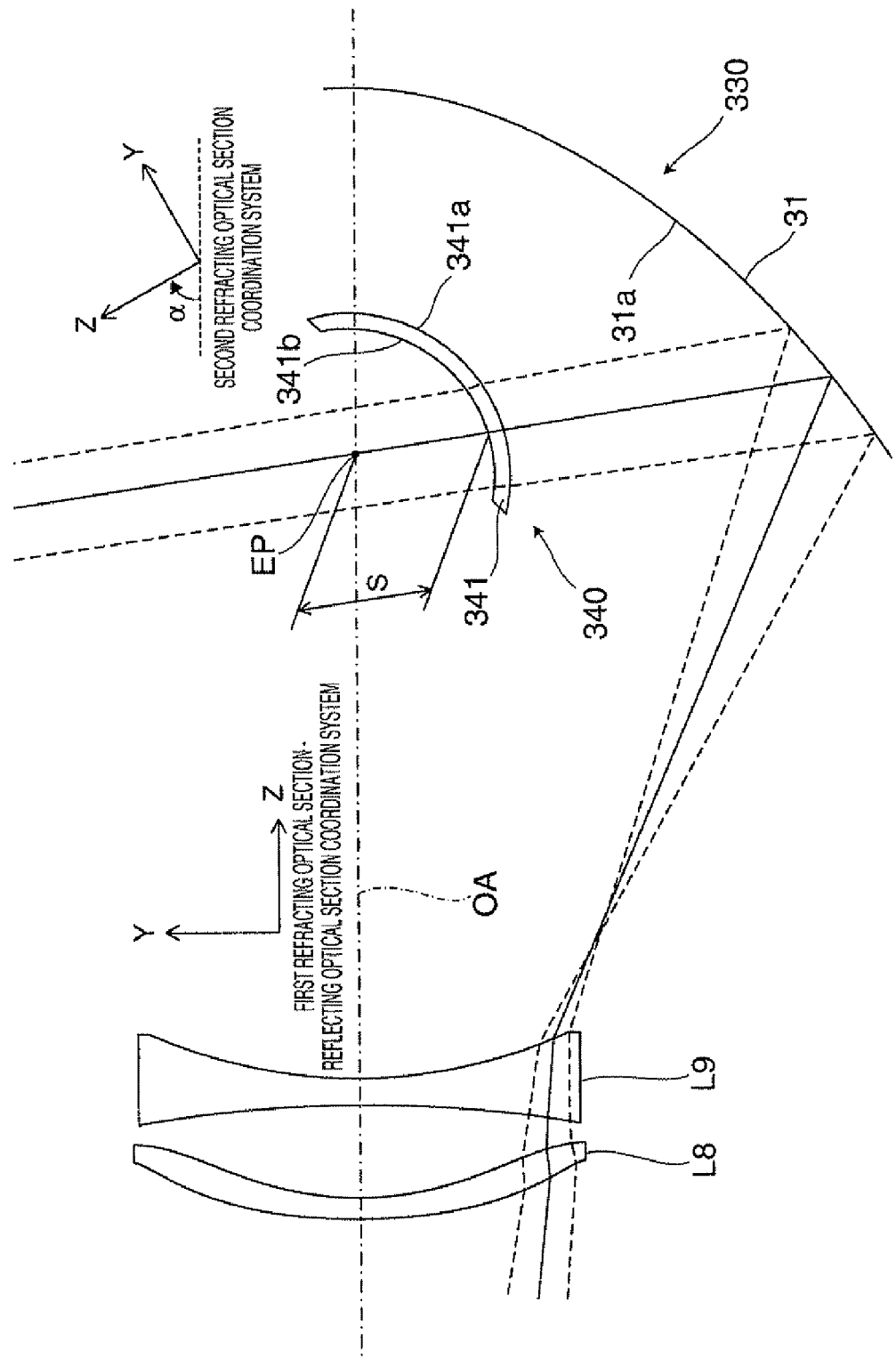
FIG. 12 is an enlarged view for explaining a substantial part of the projection optical system shown in FIG. 11.

FIG. 10 is a side view showing a substantial part of an optical system forming a projection type image display device according to a third embodiment, and FIG. 11 is a diagram for explaining a configuration of a projection optical system of the projection type image display device. Further, FIG. 12 is an enlarged view for explaining a substantial part of the projection optical system.

The projection type image display device 300 according to the present embodiment is obtained by modifying the projection type image display device 100 of the first embodiment shown in FIG. 1 and so on, and the sections not particularly explained have the same structure as the projection type image display device 100 of the first embodiment.

The projection type image display device 300 according to the present embodiment has the screen 10, a projection optical system 350, and the image forming optical section 60. The projection optical system 350 comprises a first refracting optical section 320, a reflecting optical section 330, and a second refracting optical section 340 in order from the reduction side.

The first refracting optical section 320 has the first lens L1, the second lens L2, the third lens L3, the fourth lens L4, the fifth lens L5, the sixth lens L6, the seventh lens L7, the eighth lens L8, the ninth lens L9, and the aperture 45. The eighth lens L8 is formed as aspheric lens. The reflecting optical section 330 has at least one curved mirror 31. The second refracting optical section 340 is formed of a meniscus lens 341. This meniscus lens 341 is a slightly negative lens having spherical refracting optical surfaces 341a, 341b mainly under the optical axis OA. The optical axis of the meniscus lens 341, similarly to the case with the second embodiment shown in FIG. 8, is rotated α° clockwise around the vicinity of the focal position F2 of the curved mirror 31 with respect to the optical axis OA of the first refracting optical section 320 and the reflecting optical section 330. The optical axis of the meniscus lens 341 is further decentered downward from the optical axis thus tilted to have a distance Y with the optical axis. The meniscus lens 341 is disposed so as to be opposed to the reflecting optical surface 31a of the curved mirror 31, and has an inverted domed shape (in the present specification, the inverted domed shape is also included in the domed shape in a broad sense having the domed shape convex upward as a basic shape) concave towards the posterior stage side of the light path (i.e., the magnification side). The meniscus lens 341 is a lens having a concentric sphere shape formed of a pair of spherical surfaces having, for example, the optical axis OA as the axis thereof, and disposed between the reflecting optical section 330 and the exit pupil position EP. Here, the exit pupil position EP denotes the position where the principal ray reflected by the curved mirror 31 and proceeding towards the maximum field angle intersects with the optical axis OA of, for example, the reflecting optical section 330. Thus, the meniscus lens 341 becomes a relatively small-sized protective cover for the projection optical system 350 and has a relatively small influence to the image quality. Since the meniscus lens 341 becomes a small-sized protective cover, the strength of which can easily be assured and can easily and surely be supported. Further, in the projection optical system 350, the off-axis performance is efficiently corrected by decentering the meniscus lens 341, and by providing the meniscus lens 341 with slight power, it becomes possible to achieve the correction effect. It should be noted that it is also possible to achieve the similar correction effect by using aspheric surfaces as the refracting optical surfaces 341a, 341b of the meniscus lens 341.

Table 6 below shows lens data of the projection optical system 350 described above and has the first refracting optical section 320, the reflecting optical section 330, and the second refracting optical section 340:

TABLE 6

| SURFACE NUMBER | | R | D | Nd | Nv | |
|---|---|---|---|---|---|---|
| OBJECT SURFACE | | INFINITE | 23.00 | | | |
| 1 | | INFINITE | 38.00 | 1.51680 | 64.2 | PRISM |
| 2 | | INFINITE | 3.00 | | | |
| 3 | ASPHERIC SURFACE | −428.966 | 3.50 | 1.52473 | 56.7 | |
| 4 | ASPHERIC SURFACE | −120.000 | 0.10 | | | |
| 5 | | 43.272 | 8.50 | 1.49700 | 81.6 | |
| 6 | | −76.323 | 0.10 | | | |
| 7 | | 72.850 | 8.00 | 1.48749 | 70.4 | |
| 8 | | −38.293 | 2.00 | 1.84666 | 23.8 | |
| 9 | | 32.697 | 5.50 | 1.62041 | 60.3 | |
| 10 | | 67.269 | 23.19 | | | |
| 11 | | −202.632 | 5.00 | 1.76182 | 26.6 | |
| 12 | | −30.000 | 2.00 | 1.58913 | 61.3 | |
| 13 | | −50.236 | 17.10 | | | |
| APERTURE | | INFINITE | 20.00 | | | |
| 15 | | 1831.206 | 99.40 | | | |
| 16 | | 119.397 | 7.00 | 1.67270 | 32.2 | |
| 17 | | −255.760 | 6.63 | | | |
| 18 | | −52.162 | 3.00 | 1.84666 | 23.8 | |
| 19 | | −1671.339 | 0.10 | | | |
| 20 | | 83.208 | 12.00 | 1.56732 | 42.8 | |
| 21 | | −357.687 | 65.27 | | | |
| 22 | ASPHERIC SURFACE | 126.728 | 4.00 | 1.52473 | 56.7 | |
| 23 | ASPHERIC SURFACE | 47.108 | 17.43 | | | |
| 24 | | −218.292 | 5.00 | 1.62041 | 60.3 | |
| 25 | | 96.529 | 184.19 | | | |
| 26 | ASPHERIC SURFACE | −68.338 | −35.00 | REFLECTING SURFACE | | CURVED MIRROR |
| 27 | | INFINITE | 3.00 | | | α ROTATION |
| 28 | | −30.000 | −3.00 | 1.52473 | 56.7 | Y DECENTERING |
| 29 | | −27.000 | 0.00 | | | |
| 30 | | INFINITE | 0.00 | | | Y DECENTERING |

TABLE 6-continued

| | | | | | |
|---|---|---|---|---|---|
| 31 | INFINITE | 0.00 | | | α ROTATION |
| 32 | INFINITE | −320.00 | | | |
| SCREEN | INFINITE | 0.00 | | | |

ASPHERIC SURFACE COEFFICIENT

| SURFACE NUMBER | K | A04 | A06 | A08 | A10 | A12 |
|---|---|---|---|---|---|---|
| 3 | 0.0000+E00 | −4.0624E−06 | −2.1098E−09 | 0.0000+E00 | 0.0000+E00 | 0.0000+E00 |
| 4 | 0.0000+E00 | 0.0000+E00 | 0.0000+E00 | 0.0000+E00 | 0.0000+E00 | 0.0000+E00 |
| 22 | 0.0000+E00 | 1.3528E−06 | 8.0389E−10 | −3.9057E−13 | −2.7328E−17 | 0.0000+E00 |
| 23 | 0.0000+E00 | −6.4034E−06 | 3.1488E−09 | −1.2821E−12 | 0.0000+E00 | 0.0000+E00 |
| 26 | −1.7126E+00 | −1.6532E−07 | 2.7341E−12 | 4.5999E−17 | −1.9562E−20 | 0.0000+E00 |

Further, the Table 7 below collectively shows the tilt and decentering of the meniscus lens 341 as a list.

TABLE 7

| AMOUNT OF DECENTERING SURFACE NUMBER | Y DECENTERING | α ROTATION |
|---|---|---|
| 27 | 0.000 | −60.000 |
| 28 | −25.000 | 0.000 |
| 30 | 25.000 | 0.000 |
| 31 | 0.000 | 60.000 |

In the present embodiment, although the lenses L1 through L9 are basically formed asspherical surface, the entrance and exit surfaces (surfaces 3 and 4 in the Table 6) of the first lens L1 and the entrance and exit surfaces (surfaces 22 and 23 in the Table 6) of the eighth lens L8 are formed as aspheric surfaces. Further, the reflecting optical surface 31a (the surface 26 in the Table 6) of the curved mirror 31 is formed as aspheric surface.

Table 8 shows a result obtained by applying the specific example shown in the Table 6 to the conditional expressions (1) through (3) described in the first embodiment. As is clear from the Table 8 described below, the specific example shown in Table 6 satisfies all of the conditional expressions (1) through (3) described above.

TABLE 8

| PARAMETER | | VALUE APPLIED IN SPECIFIC EXAMPLE |
|---|---|---|
| CURVED MIRROR | Ra | −68.338 |
| CURVED COVER | CONVEX SURFACE R1 | −30.000 |
| (MENISCUS) | CONCAVE SURFACE R2 | −27.000 |
| MAXIMUM FIELD ANGLE | | 80.911 |
| DISTANCE | S | 24.750 |
| (1) |R1/Ra| | | 0.439 |
| (2) R2/R1 | | 0.900 |
| (3) S/R2 | | 0.917 |

In the present embodiment, the projection light projected from the image forming optical section 60 is transmitted through the first refracting optical section 320, then folded by the reflecting optical section 330, and then emitted towards the screen 10 from the second refracting optical section 340, which has the inverted domed shape, in the projection optical system 350. The projection light emitted from the projection optical system 350 is projected on the screen projection surface 10a with a desired magnification.

It should be noted that the invention is not limited to the embodiments described above, but can be put into practice in various forms within the scope or the spirit of the invention, and the following modifications, for example, are also possible.

In the embodiments described above, although the image forming optical section 60 and the projection optical systems 50, 250, 350 are disposed under the screen 10, it is also possible to dispose them above the screen 10.

Further, in the embodiments described above, although the liquid crystal light valves 65a, 65b, and 65c are used as the image forming elements in the image forming optical section 60, it is also possible to use a light modulation device such as a device having the pixels formed of micromirrors, or an image forming section such as a film or a slide. Further, the transmitted liquid crystal light valves are changeable for LCOS type.

The entire disclosure of Japanese Patent Application No. 2007-288148, filed Nov. 6, 2007 and Japanese Patent Application No. 2008-201561, filed Aug. 5, 2008 are expressly incorporated by reference herein.

What is claimed is:

1. A projection type image display device comprising:
a projection optical system having a first refracting optical section having a plurality of lenses, a reflecting optical section having at least one concave reflecting surface, and a second refracting optical section in order from a reduction side; and
an image forming optical section disposed on an anterior stage of a light path as the reduction side of the projection optical system,
the second refracting optical section having an exit lens having either:
(1) a roughly constant thickness and disposed in a posterior stage of the light path from an exit pupil position at which a principal ray reflected by the reflecting surface and proceeding towards the maximum field angle and the optical axis of the reflecting optical section intersect with each other, and an optical surface of a magnification side of the exit lens has a shape convex towards the magnification side, or
(2) a roughly constant thickness and disposed between the reflecting optical section and an exit pupil position at which a principal ray reflected by the reflecting surface and proceeding towards the maximum field angle and the optical axis of the reflecting optical section intersect with each other, and an optical surface of a magnification side of the exit lens has a shape concave towards the magnification side,
the second refracting optical section being formed of the exit lens as a meniscus lens, and assuming a curvature radius of a convex surface of the exit lens of the second refracting optical section is R1, and a curvature radius of a concave surface of the exit lens is R2, the following condition (2) is satisfied:

$$0.7<R2/R1<1.1 \tag{2}$$

2. The projection type image display device according to claim 1,
the meniscus lens having a pair of spherical optical surfaces, and an optical axis identical to the optical axis of the reflecting optical section.

3. The projection type image display device according to claim 1,
the meniscus lens having a domed shape with a concentric sphere shape having a center of curvature of the lens surface in the vicinity of the exit pupil position.

4. The projection type image display device according to claim 1,
the meniscus lens having an optical axis decentered with respect to the optical axis of the reflecting optical section.

5. The projection type image display device according to claim 1,
at least one of the pair of optical surfaces of the meniscus lens being formed of an aspheric surface.

6. The projection type image display device according to claim 1,
the meniscus lens being formed from a resin material.

7. The projection type image display device according to claim 1,
an optical axis common to at least a part of the magnification side of the first refracting optical section and the reflecting optical section extending perpendicular to a screen for projection.

8. The projection type image display device according to claim 1,
further assuming that a curvature radius of the reflecting surface of the first refracting optical section is Ra, the following condition (1) is satisfied:

$$0.2<|R1/Ra|<2.0 \tag{1}$$

9. The projection type image display device according to claim 1,
further assuming a a distance between the exit pupil position and a position at which the principal ray intersects with the concave surface of the exit lens is S, the following condition (3) is satisfied:

$$0.3<S/R2<1.5 \tag{3}$$

10. A projection type image display device comprising:
a projection optical system having a first refracting optical section having a plurality of lenses, a reflecting optical section having at least one concave reflecting surface, and a second refracting optical section in order from a reduction side; and
an image forming optical section disposed on an anterior stage of a light path as the reduction side of the projection optical system,
the second refracting optical section having an exit lens having either:
(1) a roughly constant thickness and disposed in a posterior stage of the light path from an exit pupil position at which a principal ray reflected by the reflecting surface and proceeding towards the maximum field angle and the optical axis of the reflecting optical section intersect with each other, and an optical surface of a magnification side of the exit lens has a shape convex towards the magnification side, or
(2) a roughly constant thickness and disposed between the reflecting optical section and an exit pupil position at which a principal ray reflected by the reflecting surface and proceeding towards the maximum field angle and the optical axis of the reflecting optical section intersect with each other, and an optical surface of a magnification side of the exit lens has a shape concave towards the magnification side,
the second refracting optical section being formed of the exit lens as a meniscus lens, and
assuming that a curvature radius of the reflecting surface of the first refracting optical section is Ra, and a curvature radius of a convex surface of the exit lens of the second refracting optical section is R1, the following condition (1) is satisfied:

$$0.2<|R1/Ra|<2.0 \tag{1}$$

11. A projection type image display device comprising:
a projection optical system having a first refracting optical section having a plurality of lenses, a reflecting optical section having at least one concave reflecting surface, and a second refracting optical section in order from a reduction side; and
an image forming optical section disposed on an anterior stage of a light path as the reduction side of the projection optical system,
the second refracting optical section having an exit lens having either:
(1) a roughly constant thickness and disposed in a posterior stage of the light path from an exit pupil position at which a principal ray reflected by the reflecting surface and proceeding towards the maximum field angle and the optical axis of the reflecting optical section intersect with each other, and an optical surface of a magnification side of the exit lens has a shape convex towards the magnification side, or
(2) a roughly constant thickness and disposed between the reflecting optical section and an exit pupil position at which a principal ray reflected by the reflecting surface and proceeding towards the maximum field angle and the optical axis of the reflecting optical section intersect with each other, and an optical surface of a magnification side of the exit lens has a shape concave towards the magnification side,
the second refracting optical section being formed of the exit lens as a meniscus lens, and
assuming a curvature radius of a concave surface of the exit lens of the second refracting optical section is R2, and a distance between the exit pupil position and a position at which the principal ray intersects with the concave surface of the exit lens is S, the following condition (3) is satisfied:

$$0.3<S/R2<1.5 \tag{3}$$

* * * * *